(12) United States Patent
Khozikov et al.

(10) Patent No.: US 10,442,523 B2
(45) Date of Patent: Oct. 15, 2019

(54) SYNERGETIC NOISE ABSORPTION AND ANTI-ICING FOR AIRCRAFTS

(71) Applicant: The Boeing Company, Chicago, IL (US)

(72) Inventors: Vyacheslav Khozikov, Bellevue, WA (US); Jesse I. Follet, Bellingham, WA (US); Justin H. Lan, Bothell, WA (US); Eric H. Nesbitt, Duvall, WA (US)

(73) Assignee: The Boeing Company, Chicago, IL (US)

(*) Notice: Subject to any disclaimer, the term of this patent is extended or adjusted under 35 U.S.C. 154(b) by 107 days.

(21) Appl. No.: 14/835,659

(22) Filed: Aug. 25, 2015

(65) Prior Publication Data

US 2017/0057618 A1   Mar. 2, 2017

(51) Int. Cl.
| | | |
|---|---|---|
| *B64C 7/02* | (2006.01) | |
| *B64D 15/12* | (2006.01) | |
| *B64D 29/00* | (2006.01) | |
| *B64D 33/02* | (2006.01) | |
| *H05B 6/10* | (2006.01) | |
| *H05B 6/40* | (2006.01) | |

(52) U.S. Cl.
CPC ............... *B64C 7/02* (2013.01); *B64D 15/12* (2013.01); *B64D 29/00* (2013.01); *B64D 33/02* (2013.01); *H05B 6/101* (2013.01); *H05B 6/40* (2013.01); *B64D 2033/0206* (2013.01); *B64D 2033/0233* (2013.01); *B64D 2033/0286* (2013.01)

(58) Field of Classification Search
CPC ............ B64C 7/02; B64D 15/12; B64D 29/00
See application file for complete search history.

(56) References Cited

U.S. PATENT DOCUMENTS

| | | | | |
|---|---|---|---|---|
| 5,904,322 A | * | 5/1999 | Giamati | ............... B64D 15/166 244/134 B |
| 7,923,668 B2 | * | 4/2011 | Layland | ................ B64D 15/12 219/529 |
| 8,047,329 B1 | * | 11/2011 | Douglas | ............... G10K 11/172 181/292 |
| 8,777,163 B2 | | 7/2014 | Safai et al. | |

(Continued)

FOREIGN PATENT DOCUMENTS

| | | |
|---|---|---|
| EP | 2 292 514 A2 | 3/2011 |
| JP | 2001-278195 | 10/2001 |

(Continued)

*Primary Examiner* — Michael H Wang
(74) *Attorney, Agent, or Firm* — Haynes and Boone, LLP

(57) ABSTRACT

Systems and methods are provided for an inductive coil anti-icing and noise absorption system. In certain versions, the inductive coil anti-icing and noise absorption system may include an inductive coil and a skin. The inductive coil may generate electromagnetic fields and may electromagnetically couple with the skin. The skin, upon electromagnetically coupling with the inductive coil, may increase in temperature and the increase in temperature may melt or prevent the formation of ice on the skin. The skin or a portion of the skin may be porous and may allow incorporation of a sound absorbing liner. The sound absorbing liner may attenuate noise generated by the aircraft (e.g., noise generated by the aircraft engine). Certain versions may include a plurality of inductive coils and a plurality of skins.

26 Claims, 8 Drawing Sheets

(56) References Cited

U.S. PATENT DOCUMENTS

| | | | |
|---|---|---|---|
| 9,469,408 B1 | 10/2016 | Elangovan et al. | |
| 9,610,654 B1* | 4/2017 | Matsen | B23K 13/04 |
| 2008/0251642 A1* | 10/2008 | Boschet | B64D 15/12 |
| | | | 244/134 D |
| 2010/0206990 A1* | 8/2010 | Petrenko | B64D 15/163 |
| | | | 244/134 D |
| 2011/0049300 A1* | 3/2011 | Safai | B64D 15/12 |
| | | | 244/134 D |
| 2013/0082047 A1* | 4/2013 | Matsen | H05B 6/06 |
| | | | 219/634 |
| 2014/0070054 A1* | 3/2014 | Burton | B64D 15/12 |
| | | | 244/134 D |
| 2014/0248116 A1* | 9/2014 | Ali | F02C 7/045 |
| | | | 415/1 |
| 2015/0246730 A1 | 9/2015 | Khozikov et al. | |
| 2015/0248730 A1* | 9/2015 | Pilot | G06Q 10/0633 |
| | | | 705/4 |
| 2016/0024963 A1 | 1/2016 | Lumbab et al. | |
| 2016/0122025 A1 | 5/2016 | Hull et al. | |
| 2016/0201317 A1* | 7/2016 | Liou | E04B 1/8209 |
| | | | 181/290 |

FOREIGN PATENT DOCUMENTS

| | | |
|---|---|---|
| WO | WO 00/33614 | 6/2000 |
| WO | WO 2008/148543 | 12/2008 |
| WO | WO 2014/184146 | 11/2014 |

* cited by examiner

SYNERGETIC NOISE ABSORPTION AND ANTI-ICING FOR AIRCRAFTS

TECHNICAL FIELD

The disclosure relates generally to aircrafts and, more particularly, to aircraft anti-icing, de-icing, or both, and noise absorption.

BACKGROUND

Ice may form on surfaces of an aircraft. Currently, aircraft engines may include anti-icing or de-icing systems that feature a swirl system that uses hot gases to transfer heat to a leading edge of an engine nacelle to anti-ice and/or de-ice the engine nacelle. Such a swirl system may be pressurized and thus, to maintain the needed pressure, may need to be located within a pressurized chamber separate from other aircraft components. The pressurized system may be incompatible with other aircraft components, such as aircraft acoustic treatment, and thus any space used for the swirl system may be space that is not used for the other components. Such a system may also need to be placed in the engine inlet of an aircraft engine (i.e., the portion of the nacelle forward of the engine fans) as ice build-up tends to occur most on a leading edge.

SUMMARY

Systems and methods are disclosed herein providing a noise absorption and an anti-icing, de-icing, or both anti-icing, de-icing system. The apparatus may include a nacelle comprising a skin. The skin may be made from at least a ferromagnetic metal and/or alloy, at least a portion of the skin may be porous, at least a portion of the skin may form a flow surface of the nacelle, and the skin may at least partly define a cavity.

In certain such implementations of the apparatus, the portion of the skin that is porous may include a porous facesheet and the skin may further include a backsheet coupled to the porous facesheet. The backsheet may allow air to flow through the porous facesheet to reduce noise without the air flowing into other regions of the engine nacelle. In some such implementations of the apparatus, the skin may further include a ferromagnetic metal and/or alloy component, at least partly made of the ferromagnetic metal and/or alloy, disposed between the facesheet and the backsheet. The ferromagnetic metal and/or alloy component may allow the space between the facesheet and the backsheet to be heated. In some such implementations, the ferromagnetic metal and/or alloy component may be a septum. Air may flow from one side of the septum to the other to reduce noise. The septum or a portion of the septum may be heated and heating the septum or a portion of the septum may vary air pressure on one or the other side of the septum. The difference in pressure may aid in the flowing of air through the septum. In certain additional such implementations of the apparatus, the porous facesheet may include or be coated with the ferromagnetic metal and/or alloy and at least a portion of the skin may be located on a leading edge of the nacelle. In certain additional such implementations of the apparatus, the skin may further include a support component between the porous facesheet and the backsheet. The support sections may strengthen the skin. In certain such implementations, the support component may be a honeycomb. Honeycomb may allow weight efficient strengthening of the skin, allowing strength to be added with little increase in weight.

In certain additional such implementations of the apparatus, the portion of the skin that is porous may include at least one of a plurality of perforations, a plurality of perforations, a mesh, a porous mat, or a feltmetal-like regular or irregular cross-linked structure made of a ferromagnetic metal and/or alloy wire, sponge, or other porous media.

In certain additional such implementations of the apparatus, the portion of the skin that is porous may be configured to attenuate noise.

In certain additional such implementations of the apparatus, the apparatus may further include an inductive coil located at least partly within the cavity and configured to be electromagnetically coupled to the skin. The inductive coils may be a sandwich configuration inductive coil, a pancake configuration inductive coil, a solenoid configuration inductive coil, or another configuration of inductive coil. The skin may be configured to increase in temperature when electromagnetically coupled to the inductive coil. In certain such implementations of the apparatus, the inductive coil may be a first inductive coil and the apparatus may further include a second inductive coil located at least partly within the cavity. The two (or more) inductive coils may be configured to electromagnetically couple with two (or more) portions of the skin. The different sections of the skin may be optimally electromagnetically coupled to inductive coils of different inductances. Having two (or more) inductive coils may allow portion of the skin to be optimally electromagnetically coupled. In certain such implementations, the skin may be a first skin, the ferromagnetic metal and/or alloy may be a first ferromagnetic metal and/or alloy, and the apparatus may further include a second skin such that the second skin at least partly defines the cavity, the second skin may be made of the first ferromagnetic metal and/or alloy and/or a second ferromagnetic metal and/or alloy, the first inductive coil may be configured to be electromagnetically coupled to the first skin, and the second inductive coil may be configured to be electromagnetically coupled to the second skin. In certain such implementations, the second skin may be non-porous. The second skin may be non-porous to reduce aerodynamic drag of the engine nacelle.

In certain additional such implementations of the apparatus, the apparatus may further include a support structure within the nacelle such that the support structure may partly define the cavity and the skin may be located forward of the support structure. In such examples, the cavity, formed by at least the support structure and the skin, may be pressurized.

In some implementations, an aircraft including the apparatus may be provided. The aircraft may include a fuselage, a wing coupled to the fuselage, an engine coupled to the wing and/or the fuselage, such that at least one of the fuselage, the wing, and/or the engine may include the apparatus.

In another example, a method may be provided. The method may include receiving a skin including at least a porous facesheet and a backsheet such that at least a portion of the skin includes a ferromagnetic metal and/or alloy and coupling the skin to an engine to form at least a portion of an engine nacelle such that at least a portion of the skin forms a flow surface of the engine nacelle.

In certain such implementations of the method, the method may further include installing an inductive coil within a cavity of the engine nacelle and electrically connecting the inductive coil to a power supply. In certain such implementations, the method may further include positioning at least a portion of the skin within 1-2 inches of at least a portion of the inductive coil. In certain additional such implementations, the skin may be a first skin, the inductive coil may be a first inductive coil, the ferromagnetic metal and/or alloy may be a first ferromagnetic metal and/or alloy, and the method further include coupling a second skin to the engine such that a portion of the second skin may include the first ferromagnetic metal and/or alloy and/or a second ferromagnetic metal and/or alloy, installing a second inductive coil within the cavity of the engine nacelle such that at least a portion of the second skin is within 1 foot of at least a portion of the second inductive coil, and electrically connecting the second inductive coil to the power supply or a second power supply. In certain other additional such implementations, the power supply may be a first power supply and the method may further include connecting the second inductive coil to the second power supply.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Aircrafts may include anti-icing and/or de-icing systems. Currently, aircrafts may include an anti-icing system that contains a swirl system that uses hot gases to transfer heat to an engine nacelle to anti-ice the engine nacelle. Such a swirl system may be pressurized and thus, to maintain the needed pressure, the swirl system may need to be contained within the engine nacelle in a pressurized portion of the engine nacelle.

Aircraft engine nacelles may also include acoustic treatment to lower sound levels within and outside of the aircraft. The acoustic treatment may be incompatible with the swirl system and thus may only be positioned in areas of the aircraft not occupied by the swirl system. However, to maximize noise reduction, it may be desirable to include acoustic treatment in areas of the aircraft that may also require anti-icing. A certain such area is the engine inlet of an aircraft engine, where both anti-icing and noise reduction treatment would be beneficial. Current systems lead to an either or situation where devoting greater space to anti-icing systems leads to having less of such space available for noise reduction systems.

Figure 1:
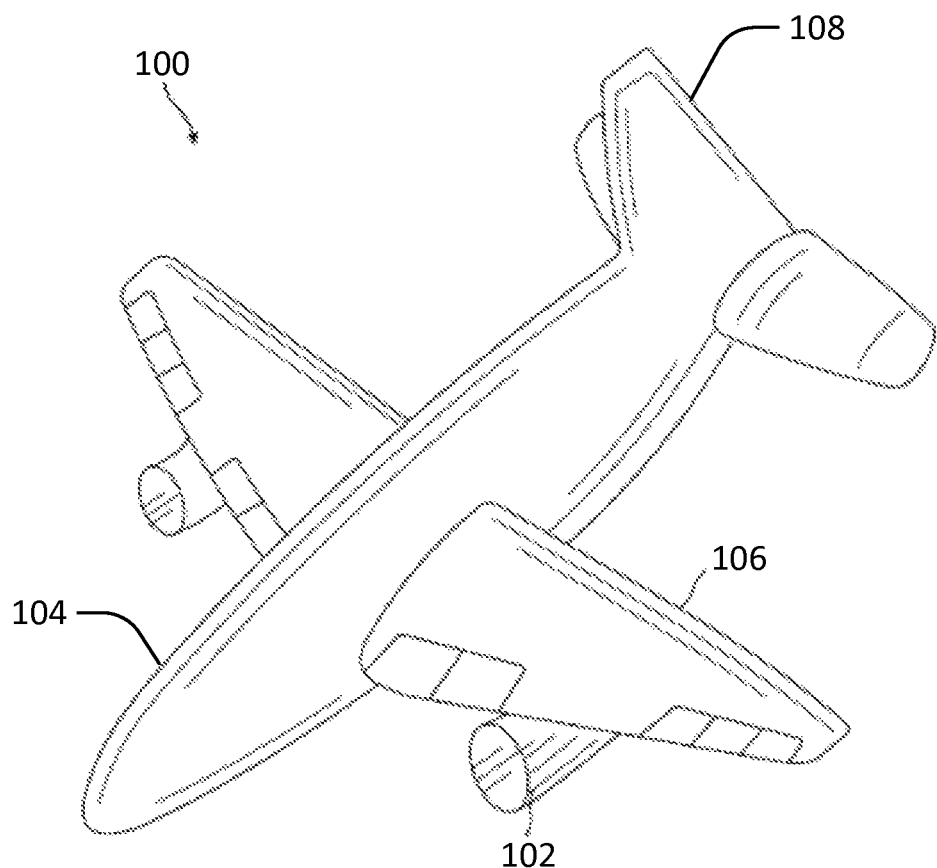
FIG. 1 illustrates an example aircraft in accordance with the disclosure.

FIG. 1 illustrates an aircraft in accordance with the disclosure. In FIG. 1, aircraft 100 includes an engine 102, a fuselage 104, an engine 106, and a tail 108. The aircraft 100 may be any type of aircraft.

The engine 102 may be any type of aircraft engine that may benefit from anti-icing and noise reduction features. Non-limiting examples of such engines include turbofans, turboprops, and turbojets. For the purposes of this disclosure, "anti-ice" or "anti-icing" may refer to either or both of the prevention of ice formation on as well as the melting of any ice that has built up on any surface of the aircraft. The fuselage 104 may be any type of aircraft fuselage. The wing 106 and the tail 108 may be control surfaces of the aircraft 100. The wing 106 and the tail 108 may include flaps. One, some, or all of the engine 102, the fuselage 104, the wing 106, and the tail 108 of the aircraft 100 may include versions of the inductive coil anti-icing system as described herein. Additionally, noise absorption features integrated within the inductive coil anti-icing system may also be present.

Figure 2:
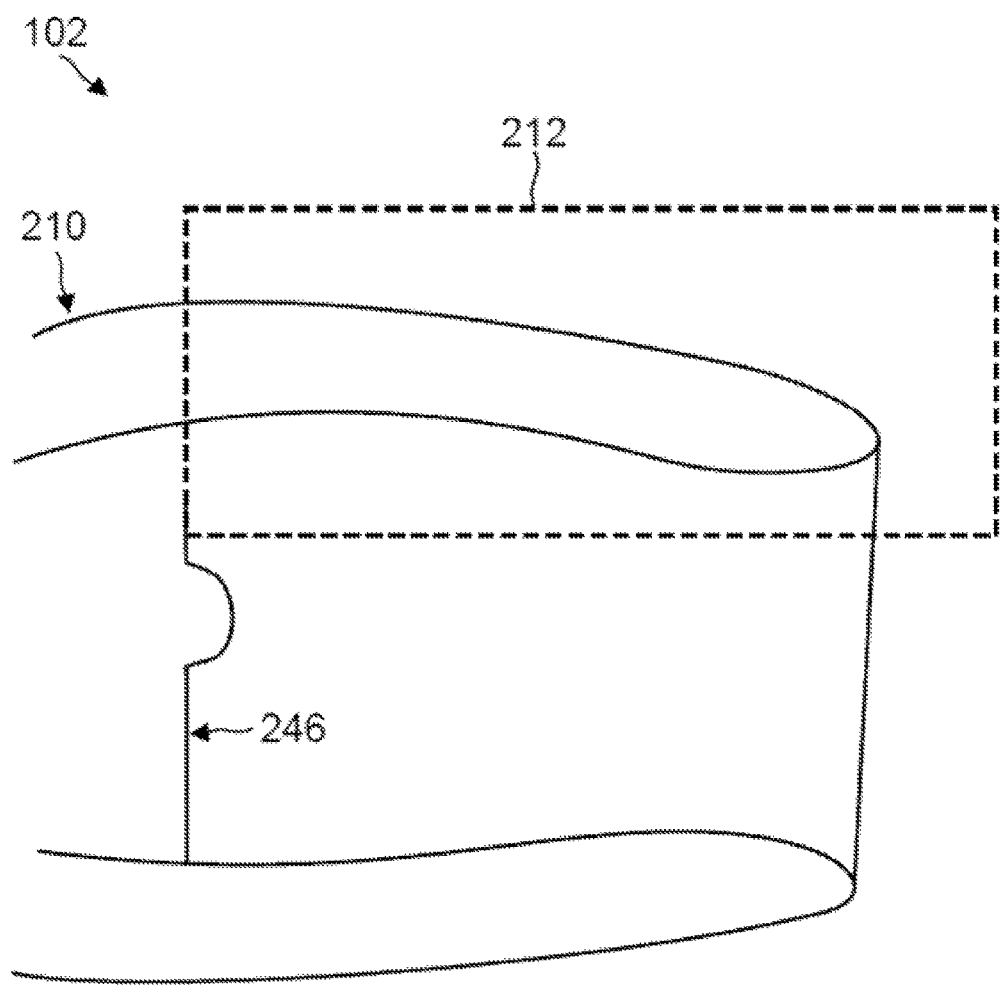
FIG. 2 illustrates an example aircraft engine in accordance with the disclosure.

In certain examples, the inductive coil anti-icing system, with or without integrated noise absorption features, may be located on an engine nacelle. FIG. 2 illustrates an aircraft engine in accordance with the disclosure. The aircraft engine 102 may include a nacelle 210 and an engine fan 246. The aircraft engine 102 in FIG. 2 may be, for example, a turbofan engine.

FIG. 2 also includes a leading edge region 212. The leading edge region 212 may be at least part of the portion of the nacelle 210 before the engine fan 246. In certain examples, perforation based noise treatments applied to engines may be located within the leading edge region 212. That is, the noise treatment may be located upstream, as defined by the airflow, of the engine fan 246. In certain examples, perforation based noise treatments may be effective upstream of the engine fan 246.

Figure 3A:
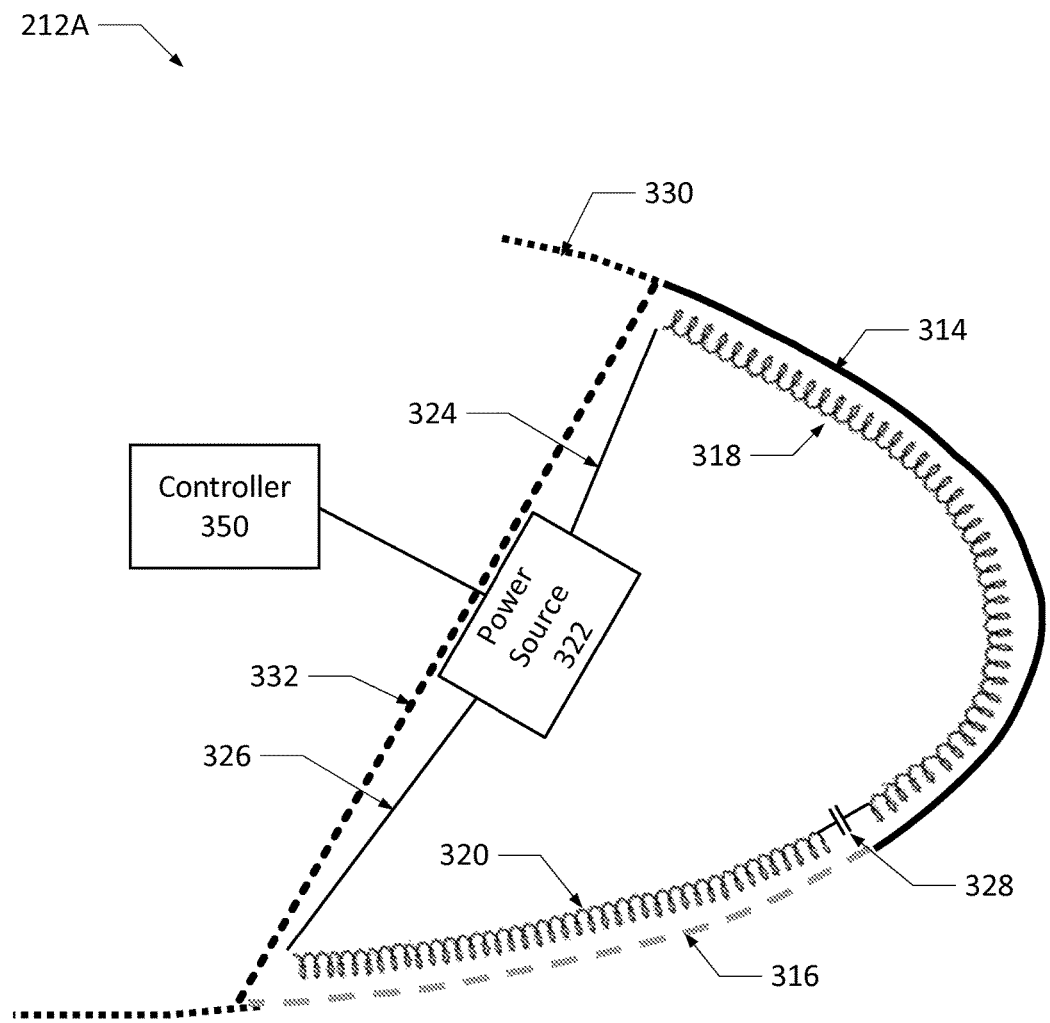
FIGS. 3A-C illustrate a portion of an example aircraft engine with various inductive coil anti-icing and noise absorption systems in accordance with the disclosure.
Figure 3B:
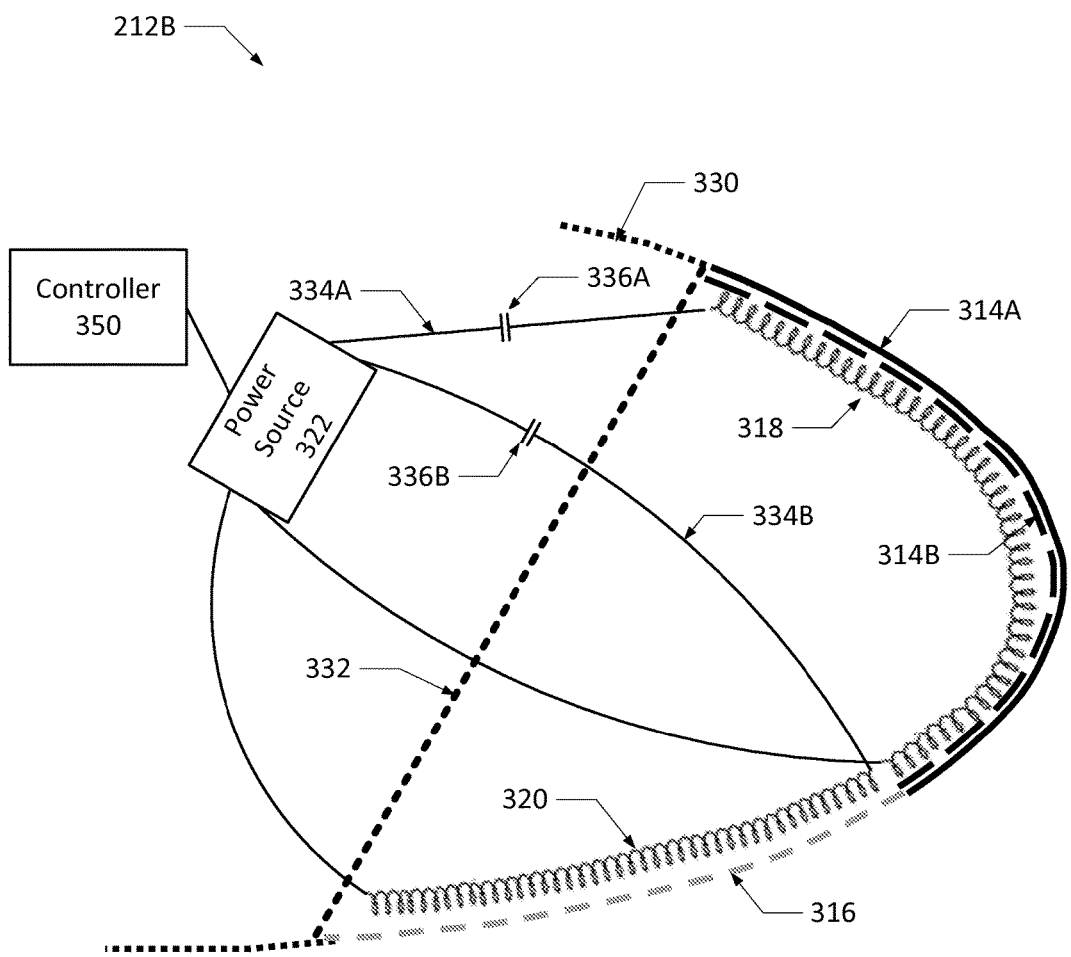
Figure 3C:
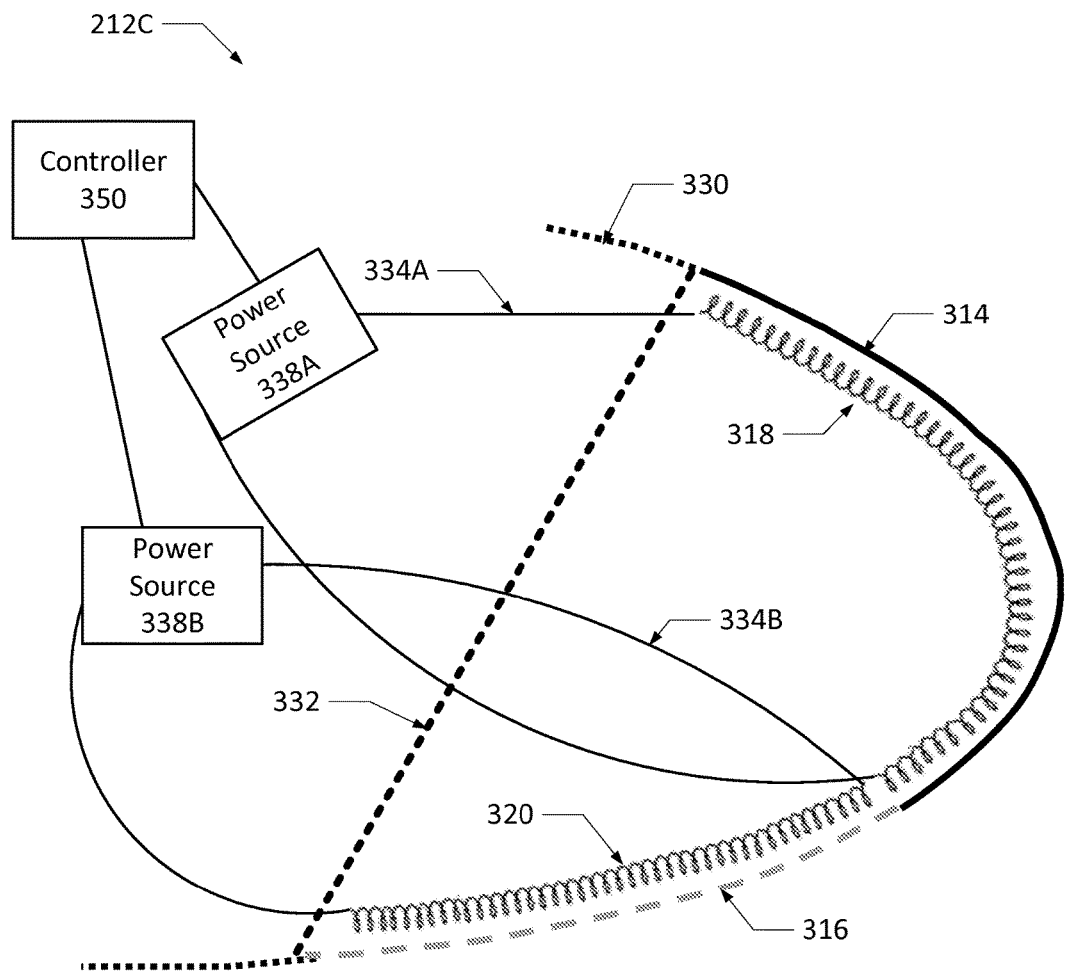

The features of the engine nacelle within the leading edge region may be further illustrated in FIGS. 3A-C. FIGS. 3A-C illustrate the leading edge region 212 of FIG. 2 in further detail. FIGS. 3A-C illustrate a portion of an aircraft engine with various inductive coil anti-icing and noise absorption systems in accordance with the disclosure.

The examples of the inductive coil anti-icing systems described in FIGS. 3A-C may all be compatible with aircraft noise treatments, such as perforation based noise treatments. Accordingly, such systems may more efficiently use the space available on an aircraft, such as space available on an aircraft engine, by having the same space be occupied by a system that performs the dual role of anti-icing and noise abatement.

Note that while FIGS. 3A-C illustrate a cutaway of a portion of an engine nacelle, the various components illustrated in FIGS. 3A-C may extend across the entire engine nacelle (e.g., may extend across the entire circumference or a portion of the circumference of an engine nacelle) or may be applied to other areas of the aircraft such as the control surfaces or the fuselage.

FIG. 3A highlights an example of an inductive coil anti-icing and noise absorption system located within a leading edge of an engine nacelle. Engine nacelle leading edge 212A of FIG. 3A includes a first skin 316, a second skin 314, a first inductive coil 320, a second inductive coil 318, a power source 322, electrical connections 324 and 326, a capacitor 328 (as well as additional capacitors where certain such additional capacitors may be configured to decouple), a non-ferromagnetic nacelle skin 330, bulkhead 332, and a controller 350. The first skin 316 and the second skin 314 may partly define a cavity that may contain the first inductive coil 320 and the second inductive coil 318. Certain examples may also include the bulkhead 332 and the bulkhead 332 may also partly define the cavity. In certain examples, the first skin and/or the second skin may form a portion of the engine nacelle. In certain such examples, the first skin and/or the second skin may not form the entirety of the engine nacelle. Such examples may locate elements of the system described herein within the portion of the engine nacelle formed by the first skin and/or the second skin.

The first skin 316 may be a single component (e.g., one sheet of metal) or may be multiple components (e.g., multiple sheets of metal coupled together). At least a portion of the first skin 316 may be ferromagnetic metal. For the purposes of this disclosure, "ferromagnetic metal" may refer to ferromagnetic materials made from one type of metal or to ferromagnetic materials made an alloy (in other words, a ferromagnetic alloy). Certain examples may include components made from both ferromagnetic metals and ferromagnetic alloys. Such examples may include systems with multiple skins or panels. The multiple panels in such examples may include at least one ferromagnetic metal panel and at least one ferromagnetic alloy panel. For examples of the first skin 316 assembled from multiple components, at least a portion of one of the components may be ferromagnetic metal. In certain such examples, the ferromagnetic metal may contain ferromagnetic metals such as INCONEL, nichrome, graphite based materials, or other types of material. Such materials may be available from a variety of vendors. Non-limiting examples of appropriate ferromagnetic metals include alloys containing chrome, steel, iron, aluminum, nickel, cobalt, and titanium, but other examples may use other ferromagnetic metals. Certain examples may include one ferromagnetic metal, or multiple different ferromagnetic metals. Any ferromagnetic metal may be used with the systems and apparatus of this disclosure, including ferromagnetic metals with magnetic susceptibilities leading to certain current densities at certain frequencies as appropriate, as to be understood by one skilled in the art. In certain examples, current densities of the ferromagnetic metal may be proportional to frequency. Appropriate magnetic susceptibility may include magnetic susceptibilities of less than 2, less than 5, less than 10, less than 20, and up to 10,000, or above 10,000. In certain such examples, a higher magnetic susceptibility may allow for a lower frequency. Lower frequencies may be used, if desired, due to, for example, electromagnetic interference considerations. Certain examples may select the ferromagnetic metal based on a combination of the magnetic susceptibility, the frequency, the available materials, and other considerations (such as environmental, packaging, reliability, etc.). The ferromagnetic metal may be a smart susceptor that may be tuned to be heated to specific temperatures when electromagnetically coupled. A smart susceptor may be a ferromagnetic metal with a known Curie temperature at which susceptibility of the metal and/or alloy to a magnetic field may start to decrease.

The first skin 316 may at least partially define a cavity. The cavity may be an interior form of, for example, the engine nacelle and may at least partially contain a first inductive coil. Inductive coils described within this disclosure may be pancake, sandwich, solenoid, etc. configurations of inductive coils. The first inductive coil 320 may, when powered, produce a first electromagnetic field. The ferromagnetic metal within the first skin 316 may couple with and/or capture the first electromagnetic field produced by the first inductive coil 320. When the metal within the skin 316 captures the first electromagnetic field, heat may be generated. The heat may prevent the formation of ice or melt any ice on the outside surface of the first skin 316 (e.g., the surface of the skin exposed to airflow).

In certain examples, the first skin 316 may be porous. That is, at least a portion of the first skin 316 may include perforations. In certain examples, the perforations may be formed by, for example, holes within the first skin 316 or by having at least a portion of the first skin 316 be produced from a mesh material. In certain such examples, the first skin 316 may include at least a porous facesheet and a backsheet. The facesheet and the backshseet of the first skin 316 may be elements of an acoustic liner. In certain examples, the porous facesheet may work in conjunction with a back cavity and a non-porous backsheet or back surface to set up a Helmholtz resonator type acoustic liner. Possible configurations of the first skin 316 may be further illustrated in FIGS. 4A-C.

The second skin 314 may be similar to the first skin 316. The second skin 314 may also be constructed from a single component (e.g., one sheet of metal) or may be multiple components (e.g., multiple sheets of metal coupled together) and at least a portion of the second skin 314 may be ferromagnetic metal. The ferromagnetic metal of the second skin 314 may be the same ferromagnetic metal of the first skin 316 or may be a different ferromagnetic metal.

The second inductive coil 318 may also be similar to the first inductive coil 320. However, in certain examples, the positioning, length, and coil configuration of the second inductive coil 318 may differ from the first inductive coil 320.

The second inductive coil 318 may, when powered, produce a second electromagnetic field. The ferromagnetic metal within the second skin 314 may couple with and/or capture the second electromagnetic field and generate heat. The heat generated by the second skin 314 may also prevent the formation of ice or melt any ice on the outside surface of the second skin 314.

In certain examples, the second skin 314 may also be porous, however other examples may have a non-porous second skin 314. A non-porous second skin may allow for noise decreasing perforations to be concentrated in areas where they reduce noise the most (e.g., on the inside of the engine nacelle) and may, for example, decrease cost and/or aerodynamic drag resulting from locating porous skins in areas where they are less useful. In certain examples, a porous first skin 316 may be located on an inside of the engine nacelle (e.g., the portion of the engine nacelle that intakes air) while a non-porous second skin 314 may be located on an outside of the engine nacelle. In such a configuration, the porous first skin 316 may be most effective at attenuating noise on the inside of the engine nacelle. On the outside of the engine nacelle, where noise attenuation through the use of a porous skin is less effective, the second skin 314 may be non-porous to decrease aerodynamic drag.

In certain examples, the second skin 314 may be constructed from a single component (e.g., one sheet of metal) or multiple components (e.g., multiple sheets of metal coupled together). In examples where either the first skin 316 and/or the second skin 314 are made of multiple components, one, some, or all of the components may include the ferromagnetic metal. When less than all of the components include the ferromagnetic metal, the ferromagnetic metal may be in thermally conductive contact with other components, such as the outer skin (e.g., the layer of the skin exposed to airflow), so as to heat the other components. As such, these other components may also be heated to prevent the formation of ice or melt any ice on the components.

The inductive coils 318 and 320, which produce the electromagnetic fields to heat the first skin 316 and the second skin 314, may be coupled to the power source 322 (e.g., be able to receive current flowing from the power source 322). The power source 322 may be an AC power source, though other examples may use a DC power source. The power source 322 may be coupled to the first inductive coil 320 and/or the second inductive coil 318 through electrical connections. In FIG. 3A, the power source 322 may be coupled to the first inductive coil 320 via the electrical connection 326 and may be coupled to the second inductive coil 318 via the electrical connection 324. Additionally, the first inductive coil 320 may be electrically coupled to the second inductive coil 318 through an electrical connection. In FIG. 3A, a capacitor 328 may be installed within the electrical connection connecting the first inductive coil 320 and the second inductive coil 318.

The example shown in FIG. 3A may have the first inductive coil 320 and the second inductive coil 318 may be coupled in series. In such an example, the capacitor 328 may be a compensating capacitor. In certain configurations, having two inductive coils connected in series may shift the resonant frequency of at least one inductive coil away from the optimal frequency. Such a situation may be compensated for by the installation of the compensating. The value of the compensating connector may be selected to affect the amount of current flowing within the coils.

The first inductive coil 320 and the first skin 316 may form a first system. The second inductive coil 318 and the second skin 314 may form a second system. The compensating capacitor may affect an amount of current flowing through the first inductive coil 320 and/or the second inductive coil 318 such that the first system and/or the second system may be operating substantially within the resonant frequency of the first system and/or the second system.

In a certain example, the resonant frequency of the first system and/or the second system may be determined through the thickness of the first skin 316 and/or the second skin 314, respectively. The characteristics of the first system and/or the second system, such as the resistance and the inductance of the first system and/or the second system, may be evaluated and the capacitance of the capacitor 328 may then be determined responsive to the other characteristics of the first system and/or the second system. The capacitor 328 may be an off-the-shelf capacitor or may have a custom capacitance. The capacitor 328 may be selected to have a capacitance to influence the first system and/or the second system such that the first system and/or the second system may be operating substantially within the resonant frequency of the first system and/or the second system.

The controller 350 may regulate the power source 322. The controller 350 may, in certain examples where the power source 322 is an AC power source, determine an optimal switching frequency of the power source 322. The controller 350 may regulate the switching frequency of the power source 322 automatically so as to "tune" the output frequency of the power source 322 to the resonant frequency of the first system and/or the second system. In other words, the controller 350 may "scan" the frequency range of the power source 322 until the controller 350 finds a spot within the frequency range where the impedance is minimal or current reaches its maximum value.

In addition, the controller 350 may also determine when to provide power to the first inductive coil 320 and the second inductive coil 318. In certain examples, the controller 350 may provide power to the inductive coils based on a schedule such as a timetable or power providing schedule, may provide power when commanded to by an operator, or may provide power to the inductive coils when an environmental factor, such as the presence of ice on a surface of the aircraft, is detected.

Certain examples may include the nacelle skin 330 and/or the bulkhead 332. The nacelle skin 330 may be a portion of the nacelle that does not include inductive coils positioned behind the nacelle skin 330 to heat the skin. In certain examples, the nacelle skin 330 may not include ferromagnetic metal within its composition. The bulkhead 332 may support part of the nacelle. Though certain examples may use the bulkhead 332 to fully seal, and thus pressurize, the cavity, the inductive coil anti-icing system does not require the cavity to be pressurized. Accordingly, certain examples may not include the bulkhead 332.

FIG. 3B highlights another example of an inductive coil anti-icing and noise absorption system located within a leading edge of an engine nacelle. Similar to FIG. 3A to the engine nacelle leading edge 212A, engine nacelle leading edge 212B of FIG. 3B may include the first inductive coil 320, the second inductive coil 318, the first skin 316, the second skin 314, the power source 322, and the controller 350.

However, unlike in FIG. 3A, the first inductive coil 320 and the second inductive 318 may be coupled in parallel to the power source 322. Electrical connector 334A may be coupled to the power source 322 and the second inductive coil 318. Electrical connector 334B may be coupled to the power source 322 and the first inductive coil 320. The electrical connector 334A may include a capacitor 336A and an electrical connector 334B may include the capacitor 336B. The first inductive coil 320 and the capacitor 336B may form a first system. The second inductive coil 318 and the capacitor 336A may form a second system. The capacitors 336A and 336B may be capacitors with capacitances chosen to equalize the impedance of the first system and the second system. Such a configuration may allow for substantially equal flow of current between the first and second system. In certain other examples, the power source 322 and the controller 350 may represent a dual-frequency power supplying system. In such examples, the controller 350 may controller the frequency of the power source 322.

FIG. 3C highlights a further example of an inductive coil anti-icing and noise absorption system located within a leading edge of an engine nacelle. Engine nacelle leading edge 212C of FIG. 3C may also be similar to the engine nacelle leading edge 212A of FIG. 3A. However, where FIG. 3A includes one power source, the example of the inductive coil anti-icing and noise absorption system in FIG. 3C includes two power sources; power sources 338A and 338B. The power source 338A may be coupled to the first inductive coil 320 via the electrical connector 3343 while the power source 338B may be coupled to the second inductive coil 318 via the electrical connector 334A.

The controller 350 may control the amount of power that each power source supplies to the respective inductive coil. In certain examples, the controller 350 may include algorithms determining the amount of current and/or the duration of power supplied to each inductive coil. Additionally, certain other examples may, instead of including two power sources, include a single power source configured to provide power to either of the first inductive coil 320 or the second inductive coil 318 or to both coils 318 and 320 in a dual-frequency power supplying mode. In such a configuration, the controller 350 may control the switching of the power source between providing power to either the first inductive coil, the second inductive coil, or both.

It is appreciated that the examples of the inductive coil anti-icing and noise absorption system described in FIGS. 3A-C are non-limiting. Other examples of the inductive coil anti-icing and noise absorption systems are possible. For example, other examples may include only one inductive coil or more than two inductive coils. Additionally, the inductive coils of such examples may be electromagnetically coupled to only one skin, but other examples may include inductive coils that are electromagnetically coupled to more than one skin (i.e., using the example shown in FIGS. 3A-C as an example, one inductive coil may be electromagnetically coupled to both the first skin 316 and the second skin 314).

Figure 4A:
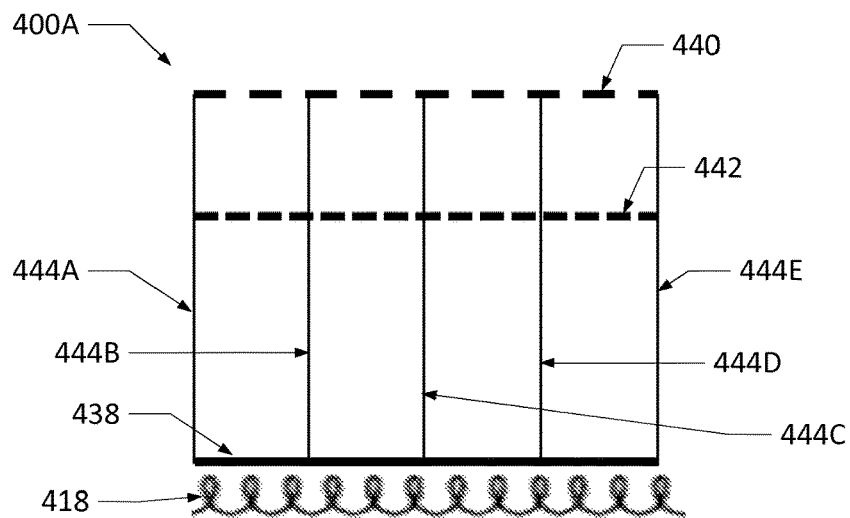
FIGS. 4A-C illustrate various example skin configurations in accordance with the disclosure.
Figure 4B:
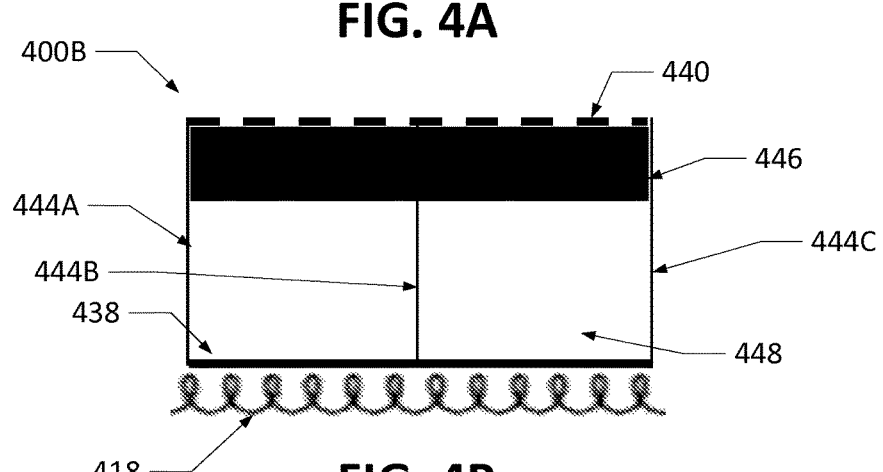
Figure 4C:
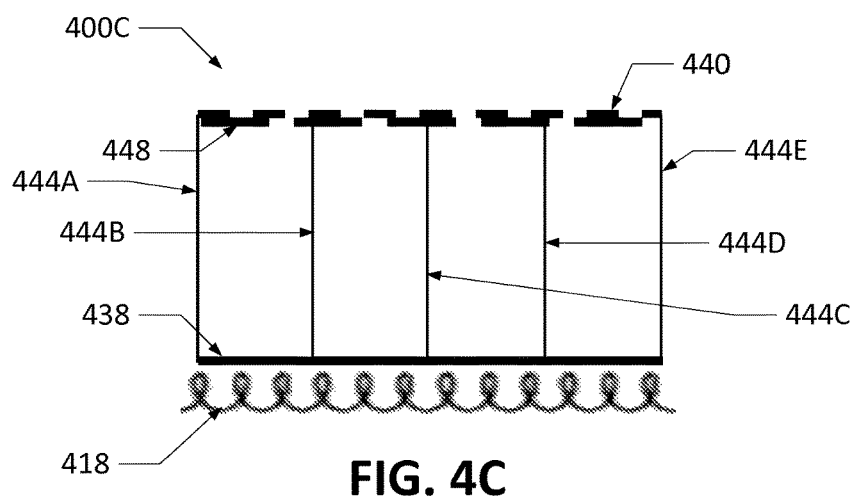

Additionally, the skin used in inductive coil anti-icing and noise absorption systems may also have various configurations. FIGS. 4A-C illustrate various skin configurations in accordance with the disclosure.

Skin 400A in FIG. 4A is such a skin configuration. The skin 400A includes a backsheet 438, a facesheet 440, a septum 442, and support components 444A-E. Additionally, FIG. 4A also includes an inductive coil 418 to illustrate a possible position of an inductive coil if the skin 400A is used as part of an inductive coil anti-icing and noise absorption system.

The backsheet 438 may be a solid sheet, though other examples may include a backsheet with a porous portion or with gaps within the backsheet. The backsheet 438, with or without support components, may structurally support the facesheet 440 and prevent at least a portion of the facesheet 440 from flexing. The support components 444A-E may additionally aid in supporting the facesheet 440. In various examples, the support components 444A-E may be structural materials such as walls and/or honeycombs that may lend additional stiffness to the skin 400A.

Referring back to the backsheet 438, in various examples, the backsheet 438 may be constructed of a material that does not include ferromagnetic metals, but other examples may construct the backsheet 438 at least with a material that includes ferromagnetic metal. In such examples, the ferromagnetic metal may couple with and/or absorb an electromagnetic field generated by the inductive coil 418 and produce heat through coupling with and/or absorbing the electromagnetic field. The heat produced may then be conducted to the facesheet 440.

The facesheet 440 may, in certain examples, be a porous facesheet. In other words, the facesheet 440 may be perforated. The perforations may allow air to flow through the facesheet 440. In certain examples, the flow of air through the facesheet 440 may attenuate noise (i.e., attenuate noise generated by the engine) through techniques described herein.

In another example, the facesheet 440 may be a mesh and the perforations may be the open area of mesh. In yet a further example, the facesheet 440 may include circular or non-circular holes or other features drilled (including laser drilled), formed, or otherwise produced into the facesheet 440.

In certain examples, the facesheet 440 may be at least partially constructed of a ferromagnetic metal. The material of the facesheet 440 may include the ferromagnetic metal or the facesheet 440 may have a non-ferromagnetic metal base material with a ferromagnetic metal layer deposited onto the base material (i.e., through a coating such as a plasma spray or a metallic aerosol spray or through deposition of the ferromagnetic metal onto the base material).

The ferromagnetic metal of the facesheet 440 may couple with and/or absorb electromagnetic waves generated by the inductive coil 418. The ferromagnetic metal may then increase in temperature and thus increase the temperature of the facesheet 440. The increase in temperature may melt any ice present on the flow surface portion of the facesheet 440 or prevent the formation on ice on the facesheet 440. The facesheet 440 may increase in temperature to any temperature, including 0 degrees Celsius or above, above 5 degrees Celsius, or 10 degrees Celsius or above. The flow surface may be any surface, such as a surface of the engine nacelle, exposed to the flow of air resulting from movement of a vehicle.

The example in FIG. 4A may additionally include the septum 442. The septum 442, in certain examples, may be at least partially constructed of a ferromagnetic metal. The ferromagnetic metal may be the same or may be different from the ferromagnetic metal that the facesheet 440 is constructed from and may generate heat from coupling with and/or receiving electromagnetic waves generated by the inductive coil 418. In such examples, the inductive coil 418 may be configured to couple with both the facesheet 440 and the septum 442. Accordingly, the inductive coil 418 may form a first system with the facesheet 440 and a second system with the septum 442. The first system and the second system may include two different resonant frequencies and the inductive coil 418 may be configured to operate at either of the resonant frequencies. In certain such examples, a controller may allow for the inductive coil 418 to operate at either of the two resonant frequencies and allow the inductive coil 418 to switch between operating from one resonant frequency to the other resonant frequency.

The septum 442 may also be a porous material and may allow air to flow from one side to the other side of the septum 442. In certain examples, the septum 442 may be heated to vary the speed of sound of the air or the pressure of the air by, for example, changing the temperature around the vicinity of the septum 442. The change in the speed of sound may change the volume of the flow of air through the perforations of the septum 442 and thus may aid in the attenuation of sound.

In addition to skin 400A in FIG. 4A, skin 400B in FIG. 4B may be another skin configuration. Skin 400B may include the backsheet 438, the facesheet 440, the inductive coil 418, and the support components 444A-C, all of which may be similar to the backsheet, facesheet, inductive coil, and support components of the skin 400A in FIG. 4A. Additionally, the skin 400B may also include a sound absorber 446.

The sound absorber 446 may be, for example, a sound absorber that includes a fiber bulk absorber, a foam layer, or a porous mat that may allow air to flow through the mat. The sound absorber 446 may be at least partially made from a ferromagnetic metal and may be made from a material that may aid in absorbing sound (e.g., a material such as a NiCr fiber bulk absorber). In certain examples where the sound absorber 446 is at least partially made from a ferromagnetic metal, the facesheet 440 may not be made from a material that includes a ferromagnetic metal. In such an example, the inductive coil 418 may electromagnetically couple with the sound absorber 446 and the sound absorber 446 may, thus, generate heat. The heat generated by the sound absorber 446 may then be conducted to the facesheet 440, raising the temperature of the facesheet 440 and melting any ice on the facesheet 440 or preventing the formation of ice on the facesheet 440.

Skin 400C of FIG. 4C may be a further skin configuration. Skin 400C may include the backsheet 438, the facesheet 440, the inductive coil 418, and the support components 444A-E, all of which may be similar to the corresponding components of the skin 400A in FIG. 4A.

In addition, the skin 400C may include an inner sheet 448. The inner sheet 448 may, in certain examples, be a mesh or porous sheet that may allow air to flow through the inner sheet 448. A further example of such a porous sheet may be a feltmetal sheet that has a cross-linked structure. The feltmetal structure may be a matrix of wire and/or mesh, for example a regular or irregular cross-linked structure made of a ferromagnetic metal wire, sponge, or other porous media. In certain examples, the inner sheet 448 may be at least partially constructed from a ferromagnetic metal. In certain such examples where the inner sheet 448 is a feltmetal, the matrix of the feltmetal may be at least partially ferromagnetic metal.

Certain examples of the skin 400C may not perfectly align the holes or porous portion of the inner sheet 448 with the holes or porous portion of the facesheet 440. Such misalignment may affect the flow of air through the facesheet 440 and/or the inner sheet 448 and thus, the misalignment may be used to tune such flow and change the noise attenuation characteristics of the skin.

In addition to the configurations described, other skin configurations may also be used with the inductive coil anti-icing and noise absorption system. For example, an additional insulating layer may be installed between the facesheet 440 and the inner sheet 448 of the skin 400C. The insulating layer may aid in the retention of heat generated by the facesheet 440 and/or the inner sheet 448 and may, accordingly, decrease the number of electromagnetic generation cycles of the inductive coil 418. Additionally, the facesheet 440 may not be present in certain examples. Instead, the supporting structure may include feltmetal mesh, possibly containing ferromagnetic metal, melted into the supporting structure.

In certain examples that use the skin at multiple locations on the aircraft, the skin may vary in thickness depending on the area of application. In certain such examples, the porous skin may be the thickest near a lip region (i.e., the forward most region) of an aircraft engine nacelle. Certain other such examples may vary the thickness of the skin depending on the noise source of the noise that needs to be attenuated. For example, different noise frequencies may be attenuated with different thicknesses.

Figure 5:
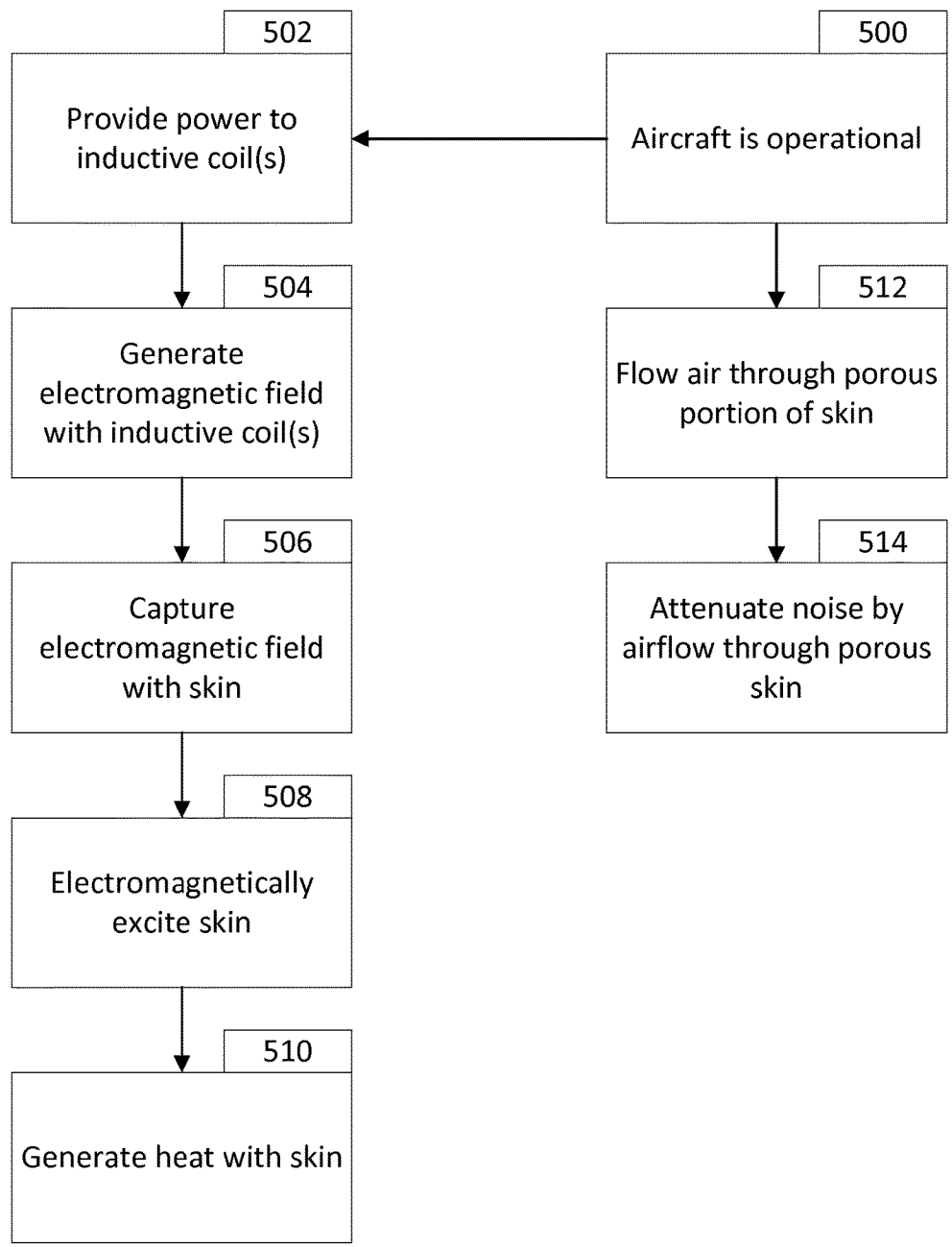
FIG. 5 illustrates a flowchart detailing an example operation of an inductive coil anti-icing and noise absorption system in accordance with the disclosure.

One, some, or all of the various skin configurations described herein may be incorporated into an inductive coil anti-icing and noise absorption system. The inductive coil anti-icing and noise absorption system may be mounted on an aircraft and may perform anti-icing and noise absorption functions concurrently. The functions may be performed at least when the aircraft is operational. FIG. 5 illustrates a flowchart detailing an operation of an inductive coil anti-icing and noise absorption system in accordance with the disclosure.

In step 500, the aircraft may be operational. The engine of the aircraft may be operational and air may flow through the components of the aircraft.

In step 502, power may be provided to the inductive coil(s). Power may be provided to the inductive coil(s) in any manner described herein. When the inductive coil(s) are powered, the inductive coil(s) may generate an electromagnetic field or multiple electromagnetic fields in step 504.

The electromagnetic fields generated in step 504 may be captured by a skin in step 506. The skin may be electromagnetically excited by the electromagnetic field. The skin, when electromagnetically excited, may generate heat in step 510. In certain examples, at least a portion of the skin may be porous.

In step 512, air may flow through the porous portion of the skin. Air may flow through, for example, a porous facesheet, a septum, an inner sheet, or other component of the skin. The airflow through the skin may attenuate noise in step 514. The noise attenuation steps 512 and 514 may occur concurrently with steps 502 to 510.

Figure 6:
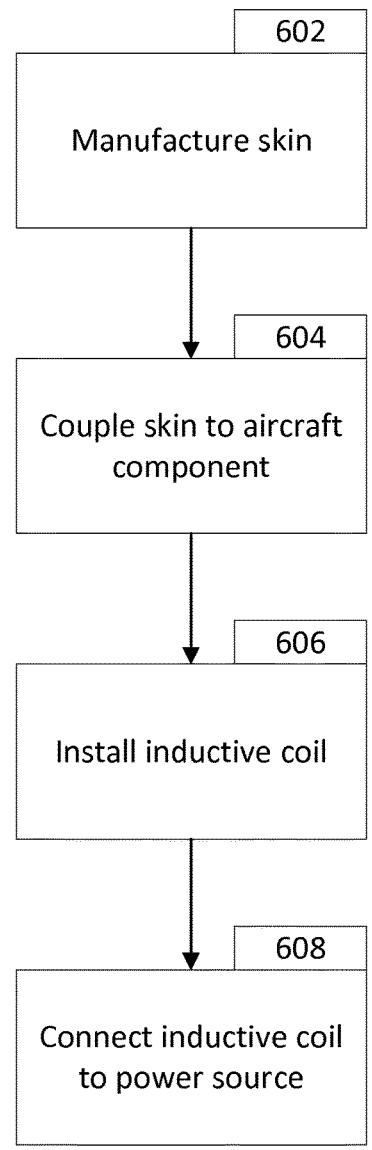
FIG. 6 illustrates a flowchart detailing an assembly process of an aircraft component containing an inductive coil anti-icing and noise absorption system in accordance with the disclosure.

The inductive coil anti-icing and noise absorption system may be assembled to the aircraft using certain techniques. An example of such a technique is shown in FIG. 6. FIG. 6 illustrates a flowchart detailing an assembly process of an aircraft component containing an inductive coil anti-icing and noise absorption system in accordance with the disclosure.

In step 602, the skin may be manufactured. The skin manufactured may be any version of the skins detailed in FIGS. 4A-C herein. The skin may include a component containing ferromagnetic metal. The component may incorporate ferromagnetic metal through the base material, through at least one coating, through deposition, through structurally or cosmetically linking the ferromagnetic material to another material, or through any other technique. In certain examples, more than one of the techniques described may be used to incorporate the ferromagnetic metal into the component.

In step 604, the skin may be coupled to the aircraft. The skin may, for example, be installed to an engine (i.e., on the engine nacelle), a wing or other airfoil, or a fuselage of the aircraft.

In step 606, the inductive coil may be installed on the aircraft. In certain examples, the inductive coil may be positioned within a cavity that is at least partly defined by the skin installed on the aircraft. At least a part of the inductive coil may be positioned within 1-2 inches of at least a part of a skin. While the example described in FIG. 6 may perform step 604 before 606, certain other examples may perform step 606 before step 604, or may perform portions of or the entirety of step 604 and portions of or the entirety of step 606 concurrently.

In step 608, the inductive coil may be connected to the power source. The power source may additionally be connected to a controller. The controller may have previously been connected to the power source, may be connected to the power source when the inductive coil is connected to the power source, or may be connected to the power source after the inductive coil has been connected to the power source. After step 608, certain examples may then perform further assembly steps. For example, where the skin and inductive coil are components of an aircraft engine, the aircraft engine may then be further installed onto a fuselage, wing, or other engine mounting point of the aircraft.

Examples described above illustrate but do not limit the invention. It should also be understood that numerous modifications and variations are possible in accordance with the principles of the present invention. Accordingly, the scope of the invention is defined only by the following claims.

What is claimed is:
1. An apparatus comprising:
a portion of a nacelle comprising a skin, wherein:

the skin comprises a ferromagnetic porous facesheet configured to electromagnetically couple with an electromagnetic field to generate heat, a ferromagnetic porous inner sheet disposed apart from and behind the porous facesheet, and a non-ferromagnetic backsheet coupled to the porous facesheet and the porous inner sheet, wherein the porous facesheet is made of a first smart susceptor configured to couple with an inductive coil at a first resonant frequency to be heated to a first temperature, and wherein the porous inner sheet is made of a second smart susceptor configured to couple with the inductive coil at a second resonant frequency to be heated to a second temperature different from the first temperature;

at least a portion of the skin forms a flow surface of the nacelle; and the skin at least partly defines a cavity.

2. The apparatus of claim 1, wherein an opening of the porous facesheet is misaligned with an opening of the porous inner sheet.

3. The apparatus of claim 1, wherein the inner sheet comprises a cross-linked structure.

4. The apparatus of claim 1, wherein the porous facesheet is comprised of or coated with a ferromagnetic metal and at least a portion of the skin is located on a leading edge of the nacelle.

5. The apparatus of claim 1, wherein the skin further comprises a support component between the porous facesheet and the backsheet, and wherein the support component comprises a honeycomb.

6. The apparatus of claim 1, wherein the inner sheet comprises at least one of a plurality of perforations, a mesh, a porous mat, or a regular or irregular cross-linked structure made of a ferromagnetic metal wire, sponge, or other porous media.

7. The apparatus of claim 1, wherein the porous facesheet is configured to attenuate noise.

8. The apparatus of claim 1, further comprising the inductive coil, wherein the inductive coil is located at least partly within the cavity and configured to electromagnetically couple to the porous facesheet and the porous inner sheet, wherein the porous facesheet and the porous inner sheet are configured to increase in temperature when electromagnetically coupled to the inductive coil, and wherein the inductive coil is configured to operate at the first resonant frequency and the second resonant frequency.

9. The apparatus of claim 8, wherein the inductive coil is a first inductive coil, the skin is a first skin, the ferromagnetic porous facesheet comprises a first ferromagnetic metal, and further comprising a second skin and a second inductive coil such that:

the second skin at least partly defines the cavity;

the second skin is comprised of the first ferromagnetic metal and/or a second ferromagnetic metal;

the first inductive coil is configured to be electromagnetically coupled to the first skin; and the second inductive coil is configured to be electromagnetically coupled to the second skin.

10. The apparatus of claim 9, wherein the second skin is non-porous.

11. The apparatus of claim 1, wherein the inner sheet comprises a sound absorber comprising a fiber bulk absorber, a foam layer, and/or a porous mat.

12. The apparatus of claim 1, wherein the inner sheet is disposed adjacent to the facesheet.

13. The apparatus of claim 12, wherein the inner sheet is disposed adjacent to the facesheet, wherein the facesheet comprises first openings, wherein the inner sheet comprises second openings, and wherein the first openings and the second openings are misaligned such that at least a portion of the second openings is obscured by a portion of the facesheet.

14. An aircraft comprising the apparatus of claim 1 and:
a fuselage;
a wing coupled to the fuselage;
an engine coupled to the wing, the fuselage, or both, wherein at least one of the fuselage, the wing, and/or the engine includes the apparatus.

15. A method comprising:
receiving a skin comprising at least a ferromagnetic porous facesheet, a ferromagnetic porous inner sheet disposed apart from and behind the porous facesheet, and a non-ferromagnetic backsheet, wherein the porous facesheet is made of a first smart susceptor configured to electromagnetically couple with an electromagnetic field at a first resonant frequency to be heated to a first temperature, and wherein the porous inner sheet is made of a second smart susceptor configured to electromagnetically couple with the electromagnetic field at a second resonant frequency to be heated to a second temperature; and
coupling the skin to an engine to form at least a portion of an engine nacelle, wherein at least a portion of the skin forms a flow surface of the engine nacelle.

16. The method of claim 15, further comprising:
installing an inductive coil within a cavity of the engine nacelle;
electrically connecting the inductive coil to a power supply; and
positioning at least a portion of the skin within 1-2 inches of at least a portion of the inductive coil.

17. The method of claim 16, wherein the skin is a first skin, the inductive coil is a first inductive coil, the ferromagnetic porous facesheet comprises a first ferromagnetic metal, and the method further comprises:
coupling a second skin to the engine, wherein a portion of the second skin is comprised of the first ferromagnetic metal and/or a second ferromagnetic metal;
installing a second inductive coil within the cavity of the engine nacelle, wherein at least a portion of the second skin is within 1 foot of at least a portion of the second inductive coil; and
electrically connecting the second inductive coil to the power supply or a second power supply.

18. The method of claim 17, wherein the power supply is a first power supply and the method further comprises connecting the second inductive coil to the second power supply.

19. The method of claim 15, wherein the inner sheet is disposed adjacent to the facesheet, wherein the facesheet comprises first openings, wherein the inner sheet comprises second openings, and wherein the first openings and the second openings are misaligned such that at least a portion of the second openings is obscured by a portion of the facesheet.

20. The method of claim 15, wherein the inner sheet comprises a sound absorber and is disposed adjacent to the facesheet, and wherein the sound absorber comprises a fiber bulk absorber, a foam layer, and/or a porous mat.

21. A method comprising:
moving a vehicle with an engine, wherein the engine includes a nacelle and at least a portion of the nacelle comprises a skin comprising a ferromagnetic porous facesheet, a ferromagnetic porous inner sheet disposed apart from and behind the porous facesheet, and a non-ferromagnetic backsheet, wherein the porous facesheet is made of a first smart susceptor configured to electromagnetically couple with an electromagnetic field at a first resonant frequency to be heated to a first temperature, and wherein the porous inner sheet is made of a second smart susceptor configured to electromagnetically couple with the electromagnetic field at a second resonant frequency to be heated to a second temperature;

flowing air through the porous facesheet; and attenuating noise by, at least, the flowing of air through the porous facesheet.

22. The method of claim 21, wherein an opening of the porous facesheet is misaligned with an opening of the porous inner sheet, and wherein the method further comprises flowing air through the porous inner sheet.

23. The method of claim 22, wherein the inner sheet is ferromagnetic and the method further comprises:

generating the electromagnetic field with an inductive coil;

electromagnetically coupling, with the electromagnetic field, the inductive coil to the ferromagnetic facesheet and/or the inner sheet; and increasing, by electromagnetically coupling the electromagnetic field to the facesheet and/or the inner sheet, temperatures of the facesheet and/or inner sheet.

24. The method of claim 23, wherein inner sheet comprises a cross-linked structure.

25. The method of claim 23, wherein the inner sheet separates the skin into a first compartment and a second compartment and the method further comprises varying the temperature between the first compartment and the second compartment by heating the first smart susceptor to the first temperature and the second smart susceptor to the second temperature.

26. The method of claim 21, wherein the attenuating noise by the flowing of air through the facesheet comprises attenuating noise generated by the engine.

* * * * *